United States Patent
Richardson, III

(10) Patent No.: US 6,170,959 B1
(45) Date of Patent: Jan. 9, 2001

(54) LIGHT EMITTING SAFETY WRAP

(76) Inventor: Charles W. Richardson, III, 4934 Gainsborough Dr., Fairfax, VA (US) 22032

( * ) Notice: Under 35 U.S.C. 154(b), the term of this patent shall be extended for 0 days.

(21) Appl. No.: 09/371,054

(22) Filed: Aug. 9, 1999

(51) Int. Cl.⁷ ................................................ G02B 5/12
(52) U.S. Cl. .................... 362/103; 362/108; 362/190; 362/191; 362/908; 362/249; 359/516
(58) Field of Search .................. 362/103, 108, 362/190, 191, 908, 249

(56) References Cited

U.S. PATENT DOCUMENTS

| | | | |
|---|---|---|---|
| 2,721,257 | 10/1955 | Knox | 240/59 |
| 4,173,201 | 11/1979 | Chao et al. | 240/6.4 W |
| 4,513,692 | 4/1985 | Kuhnsman et al. | 119/109 |
| 4,887,552 | 12/1989 | Hayden | 119/109 |
| 4,895,110 | 1/1990 | LoCascio | 119/106 |
| 4,909,189 | 3/1990 | Minotti | 119/106 |
| 5,046,456 | 9/1991 | Heyman et al. | 119/106 |
| 5,140,946 | 8/1992 | Pennock et al. | 119/106 |
| 5,566,871 | 10/1996 | Weintraub | 224/264 |
| 5,630,382 | 5/1997 | Barbera et al. | 119/859 |
| 5,879,076 | * 3/1999 | Cross | 362/103 |
| 6,059,414 | * 5/2000 | Tsai | 362/108 |

* cited by examiner

Primary Examiner—Sandra O'Shea
Assistant Examiner—Anabel M. Ton
(74) Attorney, Agent, or Firm—Ellis, Venable & Busam, LLP

(57) ABSTRACT

A light emitting safety wrap or sleeve worn by people and/or pets engaged in activities, or attached to objects during periods of limited visibility with flashing or blinking lights so as to be visible in darkness; powered by direct current; having three optional capabilities: (1) remote on-off switch and/or (2) digital voice/sound message and/or (3) Infared (IR) signaling lights.

15 Claims, 2 Drawing Sheets

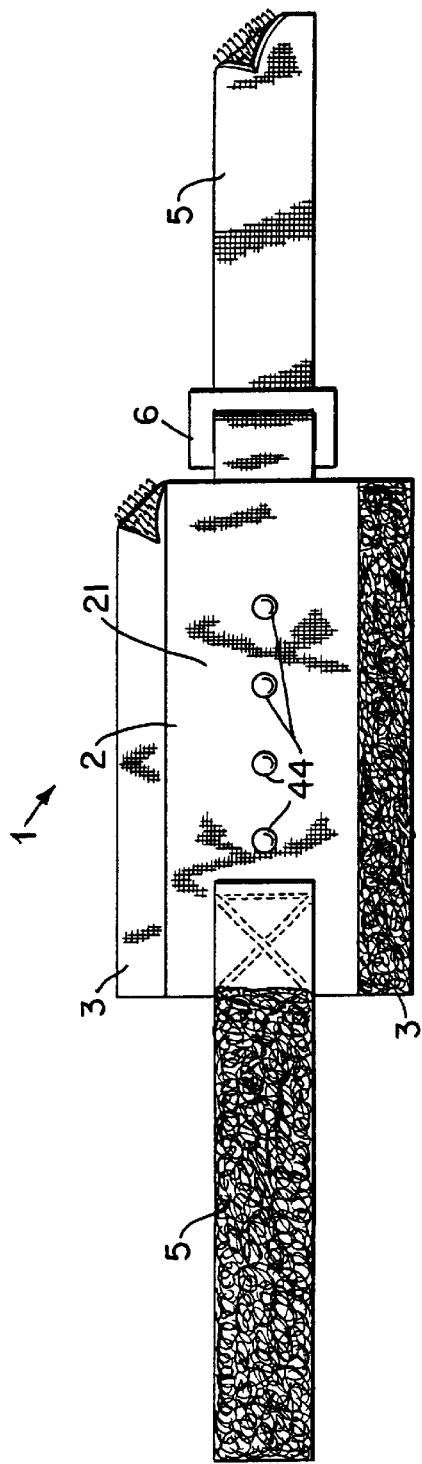
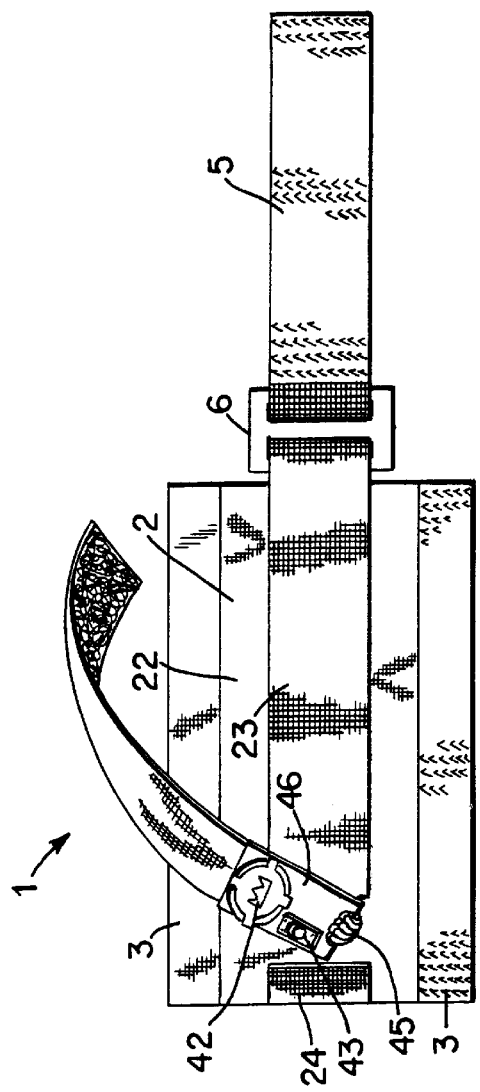

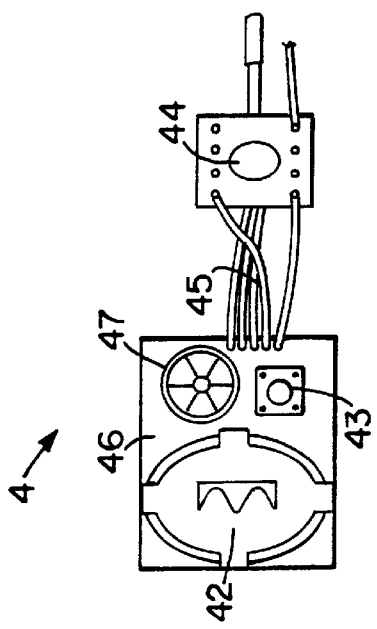
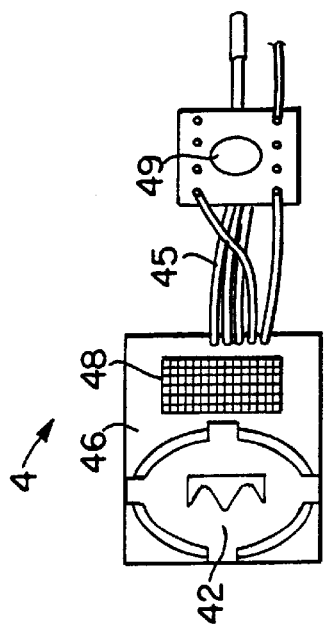
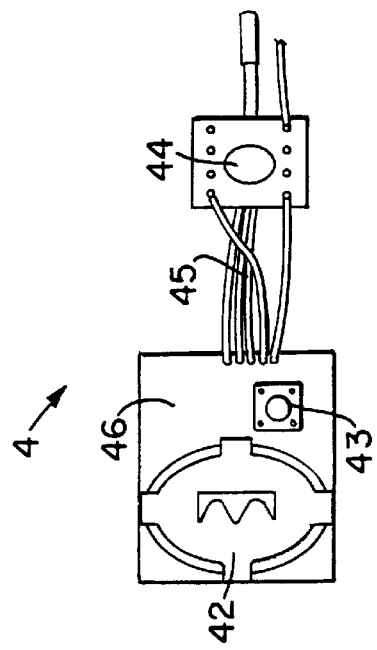
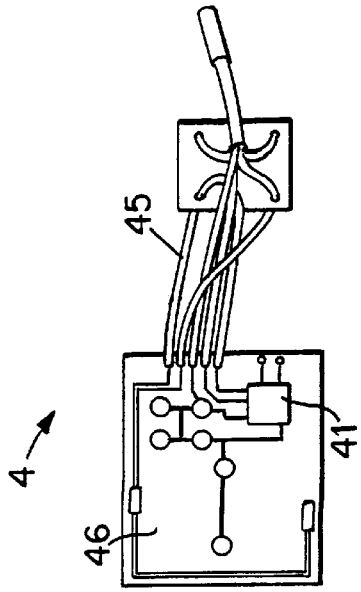

LIGHT EMITTING SAFETY WRAP

FIELD OF THE INVENTION

This invention relates to light-weight portable safety lighting worn by people, pets or affixed to items often used in periods of reduced light or darkness, such as, but not limited to, bicycles, backpacks, boats, articles of clothing, and pet collars.

DESCRIPTION OF THE RELATED ART

Vehicles most often hit people and animals at night. Children waiting for school buses or walking to or from school, especially in darker winter months, are especially susceptible. Because of this reality, collars, harnesses and vests have been developed which illuminate or reflect light. The reflective type devices are only effective when the person or animal is in the headlights of the oncoming vehicle. That often means the person or animal is within the driver's braking distance and may substantially compromise the intended effectiveness of the reflective safety device. Also, if the person or animal is running, walking or bicycling in streets toward the oncoming vehicle and located within a neighborhood where the speed limit is 35 MPH or less, the illumination necessary would have to be seen from a distance of 100 meters (which is greater than braking distance at 35 MPH). Finally, studies have shown that the constant source illumination exhibited by reflective type devices is not nearly as noticeable as flashing illumination.

Identification by pet owners of their pets presents another use for reflective or illuminated safety devices. For instance, sometimes animals escape or are let out at night for short periods. Accordingly, their owners may have a difficult time finding them even in their own yards. Cats can be particularly difficult to find even when they simply step into bushes directly abutting to their owners' homes. Furthermore, handicapped people in wheelchairs are below normal pedestrian eye level and would benefit from illumination. Another concern is for blind persons with guide dogs, canine units with police, fire and US Customs departments.

Accordingly, a need exists for a multi-purpose safety device that can be directly or remotely lit, provides the brightest flashing illumination possible (constrained by the power of a battery) with the option of an audible sound (e.g., telling a blind person the lights are on or off) and/or flashing IR for military purposes. The object of this invention is to provide these capabilities, few of which have been found or described in the prior art.

Apart from flashlights and larger safety illumination devices, the most common attempts have been for animals: Knox, U.S. Pat. No. 2,721,257, depicts a collar with a single light. Chao, U.S. Pat. No. 4,173,201, is a leather, rubber and plastic collar with protruding lights, each covered by a flanged dome, powered by dry cell battery. Kuhnsman, U.S. Pat. No. 4,513,692, is an illuminated leash with a bundle of optical fibers extending inside a flexible, hollow tube. Hayden, U.S. Pat. No. 4,887,552, is an electrically lighted leash with electric lights running longitudinally through a transparent hollow tube and includes an integral choker collar. LoCascio, U.S. Pat. No. 4,895,110, is a collar having a light source and power source along a strap member, the electrical circuitry being completed only when the strap member is engaged around the pet's neck. Minotti, U.S. Pat. No. 4,909,189, is an illuminated collar with a self-fastening strip of material which includes a reflective strip or lights. Heyman et al., U.S. Pat. No. 5,046,456, is an illuminated collar comprising a hollow, flexible, light-permeable tube with a plurality of lights. Pennock et al., U.S. Pat. No. 5,140,946, is an illuminable pet collar consisting of a hollow plastic tube containing miniature lights wired in parallel and a battery. Barbera et al., U.S. Pat. No. 5,630,382, is a illuminated pet harness employing at least one bulb that transmits light through fiber optic core that projects illumination through lenses. Weintraub, U.S. Pat. No. 5,566,871 depicts a shoulder strap cushion intended for comfort but not safety illumination.

SUMMARY OF THE INVENTION

It is an object of the present invention to provide a light emitting safety device for low-level light conditions.

It is a further object of the present invention to provide a light emitting safety device for low-level light conditions that can wrap longitudinally around a tubular structure or a strap.

It is a further object of the present invention to provide a light emitting safety device for low-level light conditions that can wrap circumferencially about a user's wrist, head, leg, or other structure.

The present invention is an illuminated multi-purpose safety wrap. In use it is affixed to dog and cat collars, apparel for people involved in leisure, sporting, law enforcement, military, outdoor jobs and other potentially dangerous activities, wheelchairs, backpack straps and book bags, belts, fanny packs and numerous other devices commonly used during periods of limited visibility. It has a plurality of lights laid out at specific intervals along the top of the wrap, the number of which depends upon the wrap size.

The lights are wired in parallel, using any one of several types of wiring harnesses (e.g., separate wires, ribbon cable, flexible printed circuit board). Lights can be any color; however, certain primary colors such as blue and green do not show well at night; white, red, and yellow do. Any of several type lights can be employed, however the current technology of Light Emitting Diodes (LEDs) permits a very high MCD (milicandela) rating with very low amperage. A battery would serve as the power source. A microchip is programmed to flash each light separately, the pulse (flash) rate set to offer a balance between battery life and visibility of the safety wrap. A manual or remote on-off switch is employed. A sound chip with amplifier and speaker can be connected to the on-off switch for the blind to permit them to know that the collar on their guide dog is lit or not lit. The safety wrap can be fastened and adjusted about the animal's neck or person's body or clothing using hook and loop fastener, buckles, or combination buckle and hook and loop fasteners. Interior straps of hook and loop allow greater flexibility of uses for the device.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C.

§ 112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

BRIEF DESCRIPTION OF THE DRAWINGS

FIG. 1 depicts an outside perspective of the present invention.

FIG. 2 depicts an inside perspective of the present invention.

FIG. 3 depicts a top perspective of the preferred electronic circuitry of the present invention.

FIG. 4 depicts a bottom perspective of the preferred electronic circuitry of the present invention.

FIG. 5 depicts a top perspective of the preferred electronic circuitry of the present invention showing an optional audible alarm.

FIG. 6 depicts a top perspective of the preferred electronic circuitry of the present invention with an optional remote radio frequency switch and infra-red light emitting diode.

DESCRIPTION OF PREFERRED EMBODIMENTS

Referring to the figures, the Light Emitting Safety Wrap 1 generally comprises a flexible sleeve portion 2, a wrap side-fastener 3, and a light emitting source 4. The wrap side-fastener 3 is affixed to said flexible sleeve portion 2 as is the light emitting source 4. In use, the light emitting source 4 is enabled to emit light and enhance the visibility of the user, and the flexible sleeve portion 2 is wrapped round a strap or a tubular structure (e.g. a backpack strap, dog collar, or bike frame tube) that will accompany a user during times of decreased visibility or low light levels.

The preferred flexible sleeve portion 2 "is substantially rectangular," further comprises a front side 21 and a backside 22, and is constructed from a fabric such as nylon. Other materials of similar strength may which may be reflective or a combination of reflective and non-reflective material may also be used for the flexible sleeve portion 2. Moreover, the rectangular piece of substantially flexible nylon has dimensions sufficient to enable constructing a Wrap 1 of adequate size. What constitutes an adequately sized Wrap 1 will depend largely on the application and the dimensions of said strap or said tubular structure upon which the Wrap 1 is used. For example, a rectangular piece of nylon that is 13" by 5.5" will suffice for most applications of the Wrap 1. The front side 21 of the Wrap 1 faces away from the strap or tubular structure, and the backside 22 of the Wrap 1 will faces towards and touches the strap or tubular structure, when the Wrap 1 is releasably attached to said strap or tubular structure Sewn, but capable of being otherwise affixed, to the flexible sleeve portion 2 is the wrap side-fastener 3 that is included in the preferred embodiment. The wrap side-fastener 3 is affixed to the edges of the longer dimension of the rectangular piece of flexible material that makes up the flexible sleeve portion 2. The wrap side-fastener 3 enables securing the flexible sleeve portion 2 about itself or around said strap or said tubular structure. In the preferred embodiment, the wrap side-fastener 3 is comprised of two strips of hook-and-loop fastener material. Alternatively, other fasteners such as buttons and snaps are capable of securing the flexible sleeve portion 2 and are also contemplated as useful sleeve fasteners 3.

The preferred light emitting source 4 further comprises a programmable microchip 41, circuit board 46, an energy source 42, an on/off switch 43, a wiring harness 45, and at least one Light Emitting Diode ("LED") 44. The preferred energy source 42 is a small pen light or flashlight dry cell battery and the on/off switch 43 a single-pole/single-throw type. Said wiring harness 45 may be either wire, ribbon cable or flexible printed circuit board and connects together the components of the electrical circuit 4. Although other types of light emitting devices, including tiny incandescent bulbs, can also be used. LEDs 44 are preferred because they use little power, have a relatively long life, and are made of durable material. The LEDs 44 will ordinarily a have hard plastic encapsulate lens and are equidistantly affixed along the wiring harness 45. Said hard plastic encapsulate lenses of the LED's 44 protrude through apertures in the flexible sleeve portion 2 to the front side 21 of the flexible sleeve portion 2. The programmable microchip 41 is preferably programmed to cause each LED 44 to cycle on and off repeatedly. The programming of the microchip 41 is considered to be within the knowledge of an ordinarily skilled practitioner. Optionally, a remote control on/off switch 48 can be used in place of the ordinary on/off switch 43. As a second option, an audible alarm 47 may be employed in the electrical circuit 4 to alert when the LED's 44 are enabled to emit light. For military purposes, InfraRed ("IR") lights 49 may be employed in place of the visible light LEDs 44 and the electrical circuit 4 connections waterproofed with silicon or epoxy.

For added durability, strength, and protection for the electrical circuit 4, a thin nylon or polypropylene strapping 23 is affixed to the backside 22 of the flexible sleeve portion 2 over the wiring harness 45 thereby "sandwiching" all of the components of the light emitting source 4 except the LEDs 44 lens portions that protrude through the front side of the flexible sleeve portion 2. An end of this strapping 24 (approximately 2") is unattached to the flexible sleeve portion 2 and serves as an easy access cover for the circuit board 46 energy source and on/off switch 43. This portion of the strapping 23 closes using hook-and-loop fastener, with one portion of the hook-and-loop fastener material, either the hook or loop portion, attached to the sleeve portion 2, and the other portion of the hook-and-loop fastener, either the loop or hook portion attached to the strapping 23. So that the Wrap 1 may also be wrapped circumferencially around and fastened about a user's wrist, head, or other structures, a sleeve end-fastener 5 is affixed to the rectangular flexible sleeve portion 2. Said sleeve end-fastener 5 preferably comprises strips of hook and loop fastener and a buckle 6 attached to the rectangular flexible sleeve portion 2 as shown in the figures.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A light emitting safety device, comprising:
   a. a substantially rectangular flexible sleeve portion having a shorter dimension and a longer dimension and constructed from a piece of fabric material;
   b. a wrap side-fastener affixed to said substantially rectangular flexible sleeve portion along first and second edges of the longer dimension of the substantially rectangular flexible sleeve portion thereby enabling longitudinal encirclement and affixation of the substantially rectangular flexible sleeve portion around an independent longitudinally shaped structure,
      i. a first portion of said wrap side-fastener attached to the first edge of the longer dimension of the substantially rectangular flexible sleeve portion,
      ii. a second portion of said wrap side-fastener attached to the second edge of the longer dimension of the substantially rectangular flexible sleeve portion; and
   c. a light emitting source comprised of a plurality of light sources, affixed to said substantially rectangular flexible sleeve portion;
   whereby said light emitting safety device is releasably affixable around, and enhances the visibility of, the independent longitudinally shaped structure.

2. The device according to claim 1 wherein said piece of fabric material is nylon material.

3. The device according to claim 2 wherein said nylon material is reflective.

4. The device according to claim 1 wherein said wrap side-fastener comprises hook and loop fastener material.

5. The device according to claim 1 further comprising a sleeve end-fastener affixed to first and second edges of the shorter dimension of the substantially rectangular flexible sleeve portion.

6. The device according to claim 5 wherein said sleeve end-fastener comprises hook and loop fastener material, a hook portion of said hook and loop fastener material attached to the first edge of the shorter dimension of the substantially rectangular flexible sleeve portion, and a loop portion of said hook and loop fastener material attached to the second edge of the shorter dimension of the substantially rectangular flexible sleeve portion.

7. The device according to claim 1 wherein said light emitting source cycles on and off.

8. The device according to claim 1 wherein said light emitting source further comprises an energy source connected by a wiring harness to an on/off switch and at least one light emitting diode.

9. The device according to claim 8 wherein said at least one light emitting diode has a plastic encapsulate lens that protrudes from a backside of the substantially flexible sleeve portion through to a front side of said substantially rectangular flexible sleeve portion.

10. The device according to claim 8 wherein said energy source is a drycell battery.

11. The device according to claim 8 wherein said on/off switch is a single-pole/single-throw type.

12. The device according to claim 8 further comprising a substantially rectangular flexible strapping material that is affixed to at least three edges of the backside of the substantially rectangular flexible sleeve portion thereby creating a pocket.

13. The device according to claim 12 wherein said wiring harness and the energy source are receivable within said pocket created by said substantially rectangular flexible strapping material.

14. The device according to claim 6 wherein the sleeve end-fastener further comprises, a buckle attached to the first edge of the shorter dimension of the substantially rectangular flexible sleeve portion that is adapted to receive, a strap of material attached to the second edge of the shorter dimension of the substantially rectangular flexible sleeve portion, a hook portion of hook and loop fastener material attached to a first side of the strap, and a loop portion of hook and loop fastener material attached to a second side of the strap.

15. The device according to claim 8 wherein the at least one light emitting diode emits infra-red light.

* * * * *